Figure 1:
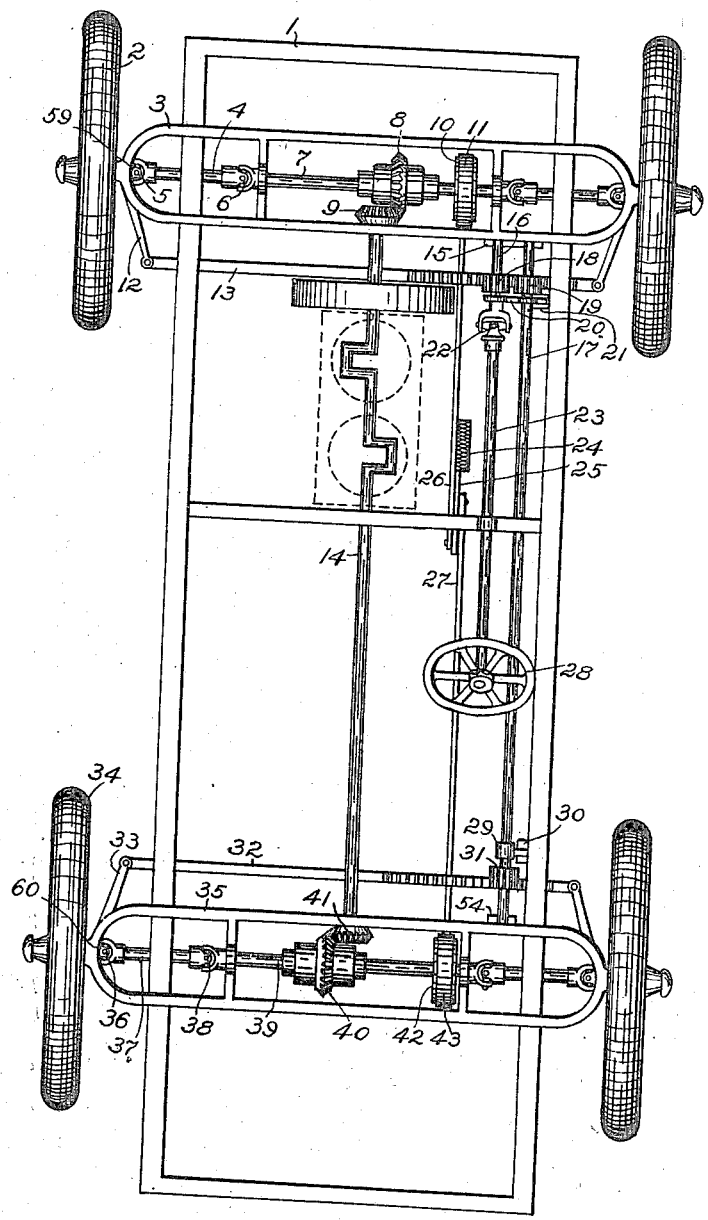

C. L. HAYS.
STEERING MECHANISM FOR MOTOR VEHICLES.
APPLICATION FILED FEB. 16, 1912.

1,093,130.

Patented Apr. 14, 1914.
2 SHEETS—SHEET 1.

Witnesses:

Inventor,
Charles L. Hays, by
G. C. Kennedy,
Attorney.

C. L. HAYS.
STEERING MECHANISM FOR MOTOR VEHICLES.
APPLICATION FILED FEB. 16, 1912.
1,093,130.
Patented Apr. 14, 1914.
2 SHEETS—SHEET 2.
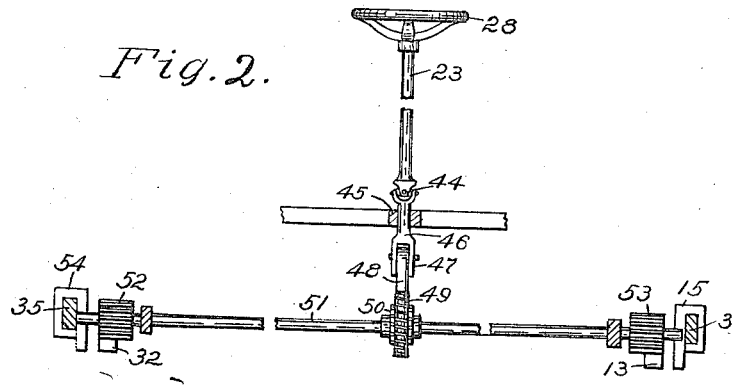
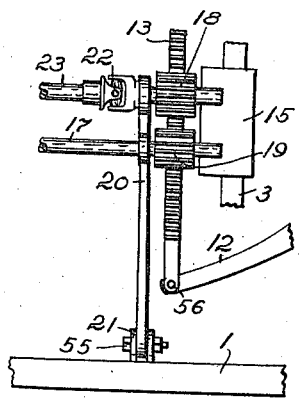
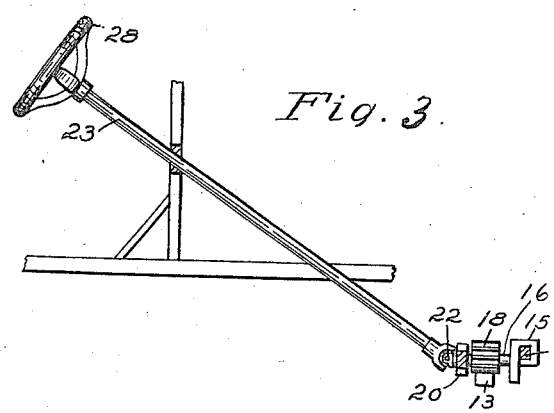
Witnesses:
Inventor,
Charles L. Hays, by
G. C. Kennedy
Attorney.

UNITED STATES PATENT OFFICE.

CHARLES LEPLEY HAYS, OF ELDORA, IOWA.

STEERING MECHANISM FOR MOTOR-VEHICLES.

1,093,130.   Specification of Letters Patent.   Patented Apr. 14, 1914.

Application filed February 16, 1912. Serial No. 678,009.

*To all whom it may concern:*

Be it known that I, CHARLES LEPLEY HAYS, a citizen of the United States of America, and a resident of Eldora, Hardin county, Iowa, have invented certain new and useful Improvements in Steering Mechanism for Motor-Vehicles, of which the following is a specification.

My invention relates to improvements in steering mechanism for vehicles, and the object of my improvement is to furnish means whereby all the wheels of a conveyance may be positively steered, particularly those of a motor vehicle having forward and rear pairs of carrying-wheels. This object I have accomplished by the means which are hereinafter described and claimed, and which are illustrated in the accompanying drawings, in which:

Figure 1 is an upper plan view of the chassis of a motor-vehicle mounted on carrying-wheels, and containing my improved steering mechanism for actuating all of said wheels in changing direction thereof simultaneously. Fig. 2 is a detail elevation of the jointed steering-wheel shaft and its operative connections with the longitudinal shaft which carries the like steering-pinions, the said connections including a method comprising a worm- and worm-wheel transmission-device. Fig. 3 is a detail upper plan view in elevation of a hand-wheel shaft with its connection to a main driving pinion in mesh with the forward rack-bar. Fig. 4 is a detail view showing the main and one of the auxiliary like pinions intermeshed with the same rack-bar, and the method of mounting and supporting the forward ends of the main and counter shafts of the steering-mechanism.

Similar numerals of reference denote corresponding parts throughout the several views.

Referring particularly to Fig. 1, which represents the chassis of a motor vehicle, the frame 1 whereof is supported on the forward and rear carrying-wheels 2 and 34 respectively, the main driving-shaft 14 is adapted to be driven by any suitable prime mover and has at its extremities bevel-pinions 9 and 41 which respectively intermesh with the main bevel-gear wheels 8 and 40 of the forward and rear differential-gears on the forward and rear axles. The said axles are alike, each comprising a pair of intermediate sections 7 operatively connected by means of the said differential gears, and which are connected at their outer ends by means of the universal joints 6 and 38 respectively with other axle-sections 4 and 37. These other sections 4 and 37 are likewise connected by means of the universal joints 5 and 36 respectively with the inner ends of the bearings of the stub-axles 59 and 60 of the carrying-wheels 2 and 34. To the inner ends of said stub-axles are secured laterally-directed arms 12 and 33 respectively, and the pair of arms 12 on the forward axles are pivotally connected by means of a rack-bar 13, while the pair of arms 33 on the rear axles 60 are pivotally connected by means of a like rack-bar 32. The steering-wheel 28, see Fig. 4, is mounted on an inclined shaft 23 whose lower end is furnished with a universal-coupling 22 with a short horizontal longitudinal shaft 16, the latter carrying a pinion 18 in mesh with the forward rack-bar 13. A like pinion 19 is also in mesh with said rack-bar and is mounted on the forward part of a longitudinal counter-shaft 17, which latter carries on its rear part a like pinion 31 which is in mesh with the rear rack-bar 32. The numerals 30 and 21 denote paired lugs projecting inwardly from one of the side-frame bars 1 and having elongated registering slots (not shown) to receive pintles of the pivotal arms 29 and 20 respectively which are provided with bearings for the said shafts 17 and 16. The said bearings are made ample enough in diameter to permit some play over said shafts. The numerals 15 and 54 denote projecting bodies secured to the transverse frame-bars 3 and 35 respectively, spaced apart to provide vertical slideways within which may be received the ends of the said shafts 16 and 17 to permit vertical oscillations of the shaft but to prevent horizontal oscillations of the same. When the steering-wheel 28 is rotated, the said intervening mechanism causes a like shifting of said rack-bars transversely, and a consequent action is had upon all the carrying-wheels to so change their directions as to cause them to conform themselves to a curved path in turning the machine as desired.

In Fig. 2, I have illustrated an alternative method of communicating rotation to the rack-bars 13 and 32 by means of a longitudinal shaft 51 having pinions 52 and 53 thereon in mesh with said rack-bars. The hand-wheel shaft 23 has a universal-joint connection 44 with a shaft-section 46 rotatable in a bearing 45, the section 46 having an adjustable jointed connection 47 with another shaft-section 48 which carries a worm 49 in mesh with a worm-wheel 50 on said shaft 51. The rotation of said shaft 23 in one direction, consequently causes a like shifting transversely of the rack-bars 13 and 32 to effect the same result upon the directions taken by the carrying-wheels as above described.

It will be seen that the mechanism of this invention occupies a minimum amount of space, and is so located as to not interfere with the proper movements of the other moving parts of the vehicle, and is supported suitably to not be dislodged by sudden oscillations of the vehicle.

Having described my invention, what I claim as new, and desire to secure by Letters Patent, is:

1. In combination, pairs of carrying-wheels, stub-axles on which said wheels are mounted, pivotal supports for said axles, said axles being provided with laterally-projecting arms, a transverse rack-bar pivotally connecting each pair of oppositely-located axle-arms, like pinions intermeshing with said rack-bars, a shaft connecting said pinions, a third like pinion mounted on another shaft and intermeshing with one of said rack-bars, and movable supporting-means for the ends of said shafts permitting only vertical oscillatory play thereof.

2. In combination, pairs of carrying-wheels, stub-axles on which said wheels are mounted, pivotal bearings for said axles, a framework in which said pivotal bearings are mounted, said axles having laterally-projecting arms, a transversely movable rack-bar pivotally connecting each pair of oppositely-located axle-arms, like pinions intermeshing with said rack-bars, a shaft connecting said pinions, and bearings in said framework for said shaft formed to permit vertical play only of the latter relative thereto.

3. In combination, pairs of carrying-wheels, stub-axles on which said wheels are mounted, pivotal bearings for said axles, a framework in which said pivotal bearings are mounted, said axles having laterally-projecting arms, a transversely-movable rack-bar pivotally connecting each pair of oppositely-located axle-arms, like pinions intermeshing with said rack-bars, a shaft connecting said pinions, spaced arms pivoted at one end of each to said framework for vertical movements and having alined bearing openings in their other ends, said shaft being rotatably seated in the bearings in said arms.

4. In combination, pairs of carrying-wheels, stub-axles on which said wheels are mounted, pivotal bearings for said axles, a framework in which said pivotal bearings are mounted, said axles having laterally-projecting arms, a transversely-movable rack-bar pivotally connecting each pair of oppositely located axle-arms, like pinions intermeshing with said rack-bars, a shaft connecting said pinions, spaced arms pivoted at one end of each to said framework for vertical movements, and having alined bearing-openings in their other ends, said shaft being rotatably seated in the bearings in said arms, and vertically-slotted bearings in said framework in which the extremities of said shaft are both rotatably and vertically slidably seated.

5. In combination, pairs of carrying-wheels, stub-axles on which said wheels are mounted, pivotal bearings for said axles, a framework in which said pivotal bearings are mounted, said axles having laterally-projecting arms, a transversely-movable rack-bar pivotally connecting each pair of oppositely-located axle-arms, like pinions, intermeshing with said rack-bars, a shaft connecting said pinions, another pinion mounted on a rotary shaft and in mesh with one of said rack-bars, means for rotating the last-mentioned pinion, vertically-grooved bearings in said framework adapted to rotatably seat the ends of said shafts for vertical play only therein, swing-arms connected to said framework for vertical play and having bearing-openings for said shafts, said arms and bearings preventing displacement of said shafts transversely of the frame while permitting vertical play only thereof.

Signed at Eldora, Iowa, this 29th day of Jan., 1912.

CHARLES LEPLEY HAYS

Witnesses:
C. M. DUREN,
D. M. MOSER.